Dec. 27, 1938.    M. BURLEIGH    2,141,901
KITCHEN UTENSIL
Filed May 12, 1937
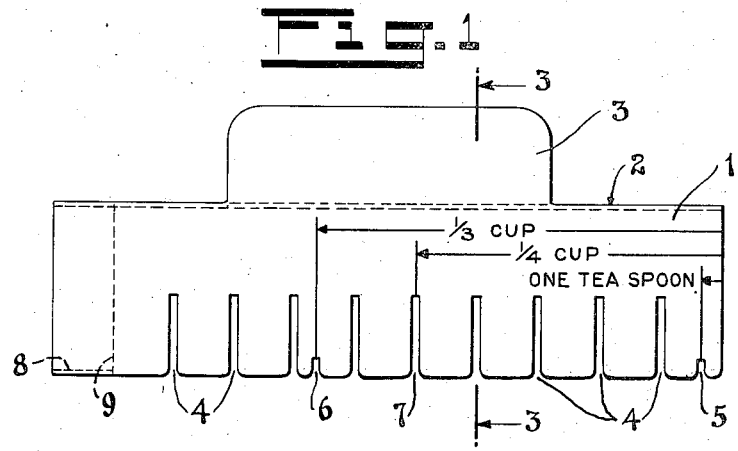
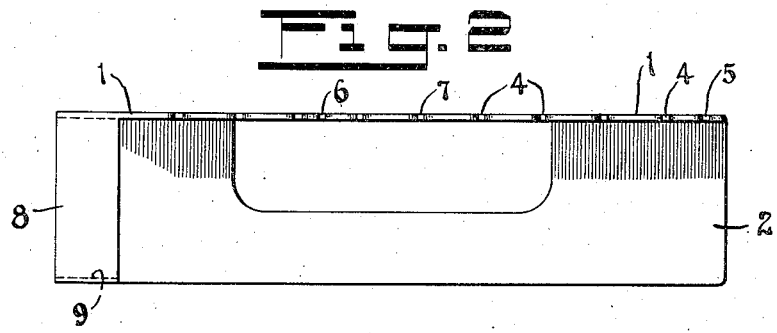
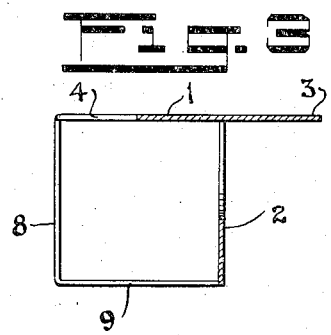
INVENTOR.
Mildred Burleigh
BY
her ATTORNEY.

Patented Dec. 27, 1938

2,141,901

UNITED STATES PATENT OFFICE 2,141,901

KITCHEN UTENSIL

Mildred Burleigh, New York, N. Y.

Application May 12, 1937, Serial No. 142,173

3 Claims. (Cl. 31—32)

This invention relates to a new and useful improvement in kitchen utensils, and specifically in devices for measuring specific quantities of butter, oleomargerine, or other cooking materials of similar plastic consistency.

In the majority of cooking recipes, the quantity of butter, lard, or other similar ingredients, is usually given in teaspoonfuls, tablespoonfuls, or multiples thereof, or in fractions of a cup. For best results the quantities used should be exactly those specified in the recipe. The majority of experienced cooks believe that they can approximate closely the specified quantity, whatever it is, without actual measurement, but investigation has shown that very often this is far from the fact. Less experienced cooks naturally have greater difficulty, and they outnumber those with greater skill many times. Furthermore, the ingredients specified are usually kept in a refrigerator, so that they are very stiff, with the result that it is practically impossible to pack them solidly into a measuring spoon or cup.

The invention of this application is designed to supplant the measuring spoon and measuring cup, and supplies means for quickly and easily measuring the desired quantities of the ingredients mentioned. Because butter is the commonest ingredient, and is generally supplied in convenient quarter pound bars, the form of the invention selected for illustration and description is adapted for use with such a bar, but it will be understood, of course, that the invention is not so limited in any way.

In the drawing:—

Fig. 1 is a plan view of the form of the invention mentioned above;

Fig. 2 is a front elevation; and

Fig. 3 is a cross section of the device of Fig. 1 taken on line 3—3 of Fig. 1 and viewed as indicated by the arrows.

The invention consists of a top plate 1 and a back plate 2, the two being joined together along an edge as shown to form a right-angle. Preferably, the length and width of each of these plates corresponds to the length and width of the well-known quarter pound bar of butter. In back plate 2 a lip may be cut out and bent backwardly and upwardly to form a handle 3, by means of which the device may be manipulated. In the front edge of top plate 1 is formed a series of deep slots 4 of sufficient width to permit a knife to pass between the sides thereof. The space between the right end of the device and first slot and between each pair of succeeding slots is equivalent to one tablespoonful of butter in a quarter pound bar. A shallow slot 5 is also provided to indicate a teaspoonful of butter and also a similar shallow slot 6 to indicate one-third of a cup of butter. A quarter of a cup of butter is indicated by the deep middle slot 7, since one-quarter of a cup is equivalent to one-eighth of one pound, or half of a quarter pound bar.

At the left end of the device the top and back plates are extended a distance equal to that between adjacent slots 4, and similar front and bottom plates 8 and 9 are added to form a hollow square, as best shown in Figures 2 and 3, the purpose of which will be hereinafter explained.

To use the device for obtaining an accurate teaspoonful, tablespoonful, or multiple thereof, of butter from a quarter pound bar, it is placed upon the bar with the hollow square just referred to abutting its left end, and with the back plate 2 against the back of the bar. The top plate will then accurately cover the top of the bar. If a tablespoonful of butter, or multiple thereof, is desired, a knife is simply passed through the correct slot 4, and through the bar of butter at that point, after which the device is removed and the severing of the required quantity of butter completed. In this way the tablespoonful, or multiple thereof, is quicky and accurately obtained.

If a teaspoonful only is required, the knife is passed through slot 5. If a third of a cup is desired, the slot 6 indicates the point at which the bar is to be cut. In case the bar has already been partly used, it is only necessary to place the device upon the bar so that its right end registers with the right end of the bar, and then to perform the operations described above. In this case the hollow square mold formed by plates 8 and 9 and extensions of the top and back plates 1 and 2 serves as a support for the left end of the device so that it will still lie flat upon the bar of butter irrespective of how short the remainder of the bar may be.

The depths of slots 4 and 7 are preferably as great as are consistent with maintaining adequate strength in top plate 1. Preferably they should extend completely across the top plate, if the material of which it is made is sufficiently stiff to resist bending, since it would then be possible to complete the severance of the desired quantity of butter by a single stroke of the knife and without removing the device from the bar.

Since for cooking purposes many cooks use butter cut from a large tub in no particular shape, the device described above would not serve to measure definite quantities therefrom. To meet this contingency a mold having a one-tablespoon capacity is provided at the left end of the device. For this purpose the top and bottom plates are extended, as shown, and joined to a front plate 8 and a bottom plate 9, to form a hollow square mold, the capacity of which is equal to one tablespoon.

In use a chunk of butter somewhat larger in size than the quantity required may be placed upon a suitable flat surface, and the hollow mold forced through it, after which the surplus may be removed from the top and sides of the square so that the amount remaining within the square will be an accurate tablespoonful, or the device may be placed left end down on the surface and the mold packed full by means of a spoon or knife. When this hollow mold is used the top and back plates 1 and 2 serve as a handle, by means of which the mold may be forced into a chunk of butter or held, while the mold is being packed as above described.

I claim:

1. A device for measuring one tablespoonful, or any multiple thereof, from a standard quarter pound bar of butter, which consists of top and back plates disposed at right angles to each other and joined together along one edge of each, the dimensions of said top plate corresponding to those of the top of the bar of butter, the edge of said top plate opposite to that joined to the back plate being intersected by a series of inwardly-projecting slots spaced so as to form a series of tongues of equal width, the width of each tongue being equal to the length of the section of the bar of butter which corresponds to one tablespoonful in volume, said slotted edge of said top plate being also provided with supplementary slots to indicate the points at which the bar of butter should be cut to remove sections equal to one teaspoonful and one-third cup, respectively.

2. A device for measuring specific quantities of butter and other plastic cooking ingredients, which consists of a plate provided with a plurality of tongues of uniform width separated from each other by slots of sufficient width to permit a knife to be passed therethrough, and supplementary measuring means adjoining said plate which consists of a mold open at opposite ends, but otherwise closed, said plate constituting a handle for said mold.

3. A device for measuring one tablespoonful, or any multiple thereof, from a standard quarter pound bar of butter, which consists of top and back plates disposed at right-angles to each other and joined together along one edge of each, the dimensions of said top plate corresponding to those of the top of the bar of butter, the edge of said top plate opposite to that joined to the back plate being intersected by a series of inwardly-projecting slots spaced so as to form a series of tongues of equal width, the width of each tongue being equal to the length of the section of the bar of butter which corresponds to one tablespoonful in volume, and supplementary measuring means consisting of a mold adjoining said top and back plates and open at opposite ends, but otherwise closed, and having a capacity equivalent to one tablespoonful, said top and back plates constituting a handle by means of which said supplementary measuring means may be held and manipulated.

MILDRED BURLEIGH.